United States Patent [19]

Gupta

[11] Patent Number: 5,195,152
[45] Date of Patent: Mar. 16, 1993

[54] MULTICHANNEL OPTICAL RECORDING APPARATUS EMPLOYING LASER DIODES

[75] Inventor: Mool C. Gupta, Webster, N.Y.

[73] Assignee: Eastman Kodak Company, Rochester, N.Y.

[21] Appl. No.: 787,159

[22] Filed: Nov. 4, 1991

[51] Int. Cl.⁵ .............................................. G02B 6/30
[52] U.S. Cl. ..................................... 385/49; 385/132; 369/44.12; 369/121
[58] Field of Search ...................... 385/132, 49, 50, 51; 369/44.12, 121, 122

[56] References Cited

U.S. PATENT DOCUMENTS

| | | | |
|---|---|---|---|
| 4,318,058 | 3/1982 | Mito et al. | 385/49 |
| 4,495,412 | 1/1985 | Thoone et al. | 385/132 |
| 4,897,671 | 1/1990 | Mahapatra et al. | 346/107 |
| 4,998,231 | 3/1991 | Watanabe et al. | 369/121 |
| 5,109,447 | 4/1992 | Chan | 385/49 |

OTHER PUBLICATIONS

Reno, C. W., Optical Disk Recording Techniques for Data Rates Beyond 100 Mbps, SPIE, Proc 421 (1983), pp. 156-162.

Kowalski, D. C., et al, Multichannel Digital Optical Disk Memory System, Optical Engineering, vol. 22, No. 4, 1983, pp. 464-472.

Primary Examiner—John D. Lee
Assistant Examiner—S. Barns
Attorney, Agent, or Firm—William W. Holloway

[57] ABSTRACT

An apparatus for recording onto and reading from an optical disk includes an array of laser diodes that emit a plurality of laser beams with each beam at the diode source spaced a distance greater than about 50 $\mu$m from adjacent beams. The apparatus includes a plurality of channel waveguides coupled to the plurality of laser diodes with each channel waveguide associated with a respective laser diode for directing light emitted by the diodes toward the optical disk for optical recording and for receiving reflected light from the optical disk for reading the optical disk. Each beam emanating from the channels is spaced from adjacent beams a preselected distance less than about 50 $\mu$m.

26 Claims, 5 Drawing Sheets

MULTICHANNEL OPTICAL RECORDING APPARATUS EMPLOYING LASER DIODES

TECHNICAL FIELD

The present invention pertains generally to multichannel optical recording apparatus, and, more particularly, to an array of laser diodes and waveguides for directing beams of light onto an optical disk for optical recording and receiving reflected light from the optical disk for reading the optical disk.

BACKGROUND OF THE INVENTION

Optical recording technology uses an optical disk which compacts large quantities of data into a small amount of space. To take full advantage of the highly compacted data, higher data transfer rates and faster access times are highly desirable. One way to achieve higher data transfer rates and faster access times is to use multichannel recording. One way to accomplish multichannel recording is to use a high powered laser, such as a gas laser, and divide the beam into several beams and control each beam separately. Such systems are disclosed in articles by C. W. Reno entitled "Optical Disk Recording Techniques for Data Rates Beyond 100 Mbps", SPIE Pro. 421, 156 (1983), and D. C. Kowalski et al entitled "MultiChannel Digital Optical Disk Memory System", Opt. Eng. 22, 464 (1983). The systems disclosed, however, are very complex systems.

An easier way to build a multichannel recording system is to use an array of semiconductor laser diodes. U.S. Pat. No. 4,897,671 which issued Jan. 30, 1990 to Amaresch Mahapatra, Roy W. Miller and Elias Snitzer discloses an integrated optics printhead that includes an array of semiconductor lasers. A problem with fabricating laser diode arrays is that laser diode arrays can only be fabricated with each source separated by a distance of at least 50 to 100 $\mu$m. As the distance between the sources is decreased below 50 $\mu$m the thermal, electrical and optical crosstalk between sources becomes a serious problem. A greater source-to-source distance requires a collector lens with a wide field of view, and off-axis beams tend to be seriously aberrated. Accordingly, it will be appreciated that it will be highly desirable to have an array of laser diodes wherein each laser source is effectively separated from the next laser source by a distance less than 50 $\mu$m and which does not require a collector lens with a wide field of view that aberrates the off-axis beams.

SUMMARY OF THE INVENTION

The present invention is directed to overcoming one or more of the problems set forth above. Briefly summarized, according to one aspect of the present invention, a multisource array directs light onto an optical disk for optical recording and receives reflected light from the optical disk for optical reading. The multisource array comprises a means for multichannel recording. The means for multichannel recording includes a plurality of laser diodes with each of the diodes spaced a preselected distance from adjacent diodes. The means for multichannel recording also includes a plurality of channel waveguides that are coupled to the plurality of laser diodes with each channel waveguide associated with a respective laser diode so that light emitted by the plurality of laser diodes is channeled for convergence at a point outside of the waveguides.

The laser diode array also includes means for multichannel reading. The means for multichannel reading includes a plurality of detectors that detect reflected light and a plurality of detector waveguides. Each detector waveguide is associated with a selected one of the detectors and is taper coupled to a selected one of the channel waveguides so that reflected light travelling in the selected channel waveguide is channeled to the selected detector. The means for multichannel reading may also include a beam splitter that is positioned in one of the channel waveguides and detector means for detecting light and reflected light by means of the beam splitter.

According to another aspect of the present invention, an apparatus for recording information onto and reading information from an optical disk comprises an array of laser diodes. The array of laser diodes has a plurality of laser diodes with each diode spaced a distance greater than about 50 $\mu$m from adjacent diodes and has a plurality of channel waveguides. The waveguides are coupled to the plurality of laser diodes with each channel waveguide associated with a respective laser diode for directing light emitted by the plurality of laser diodes toward the optical disk for optical recording and for receiving reflected light from the optical disk for reading the optical disk. By using appropriately shaped waveguides, beams emanating from the waveguides are spaced closer to one another than about 50 $\mu$m. Close beam spacing allows the use of a collector lens with a small field of view whereby the beams will be much less aberrated than normally expected with such close spacing. Increasing the distance between adjacent diodes above about 50 $\mu$m while decreasing the distance between adjacent beams below about 50 $\mu$m reduces thermal, electrical and optical crosstalk between sources so that they are not a serious problem.

According to the present invention, a plurality of laser diodes are positioned so that each diode is spaced a preselected distance from adjacent diodes. Various options for layout of the diode lasers enable optical beams from the diode lasers to be brought closer to a separation of about 10 $\mu$m. Because of this close spacing, the present invention provides for independently recording and reading information using many channels for higher data rates. It also facilitates integration of components.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE PREFERRED EMBODIMENTS

Figure 1:
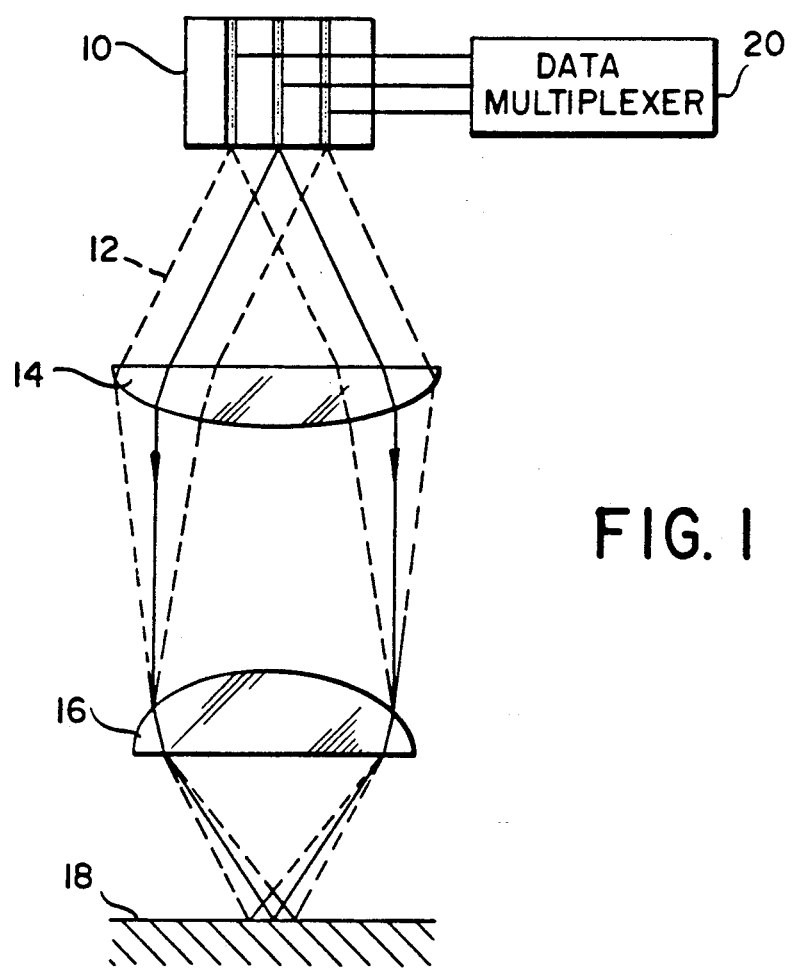
FIG. 1 is a diagram of a preferred embodiment of multichannel recording apparatus with a laser diode array constructed in accordance with the present invention.

Referring to FIG. 1, the basic portions of an optical recording and reading system are illustrated. The data to be recorded is first applied to recording circuitry (not shown) which encodes the applied data. The encoded data from the recording circuitry is applied to the laser optical system which includes a multisource array 10. The multisource array 10 generates laser beams 12 that are collimated by collector lens 14 and focused by objective lens 16 onto the surface of an optical recording disk 18. The encoded data is coupled to the array 10 via a data multiplexer 20. The focused beam 12 can be regarded as a highly multiplexed data channel with each point in the dynamic image representing an independent data stream so that it is possible to transfer many data channels simultaneously through one optical head in an otherwise conventional optical recording system.

Figure 2:
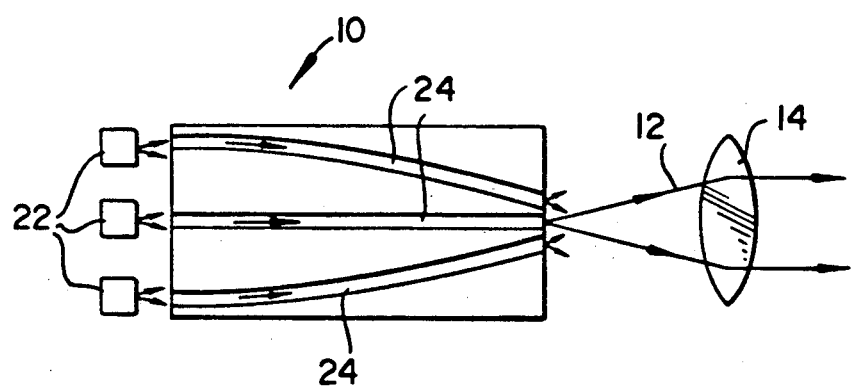
FIG. 2 is a diagrammatic illustration of the laser diode assembly of FIG. 1 showing the laser diodes edge coupled to channel waveguides.

FIGS. 2-5 illustrate various options for the layout of the multisource array 10 whereby the optical beams 12 from the diode lasers 22 can be brought closer together to a separation of about 10 $\mu$m. In FIG. 2 the diode lasers 22 are edge coupled to waveguides 24. The waveguides 24 are curved to bring light beams closer while the diode lasers 22 are separated farther apart. The waveguides 24 are preferably constructed of low loss materials so that for a typical propagation distance of about 1 cm, total optical losses are less than about 0.5 decibels. With the proper matching of numerical aperture of laser diodes to numerical aperture of the waveguides, coupling efficiencies of 50 percent or greater can be achieved. It has been experimentally determined that coupling efficiencies of over 30 percent are possible without any anti-reflection coatings on the waveguide surfaces when there is precise alignment of the laser diodes 22 with the waveguides 24.

Figure 3A:
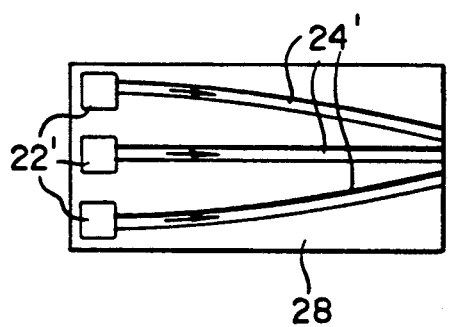
FIGS. 3a and 3b are diagrammatic illustrations of the laser diode array of FIG. 1 showing the laser diodes mounted on a silicon substrate.
Figure 3B:
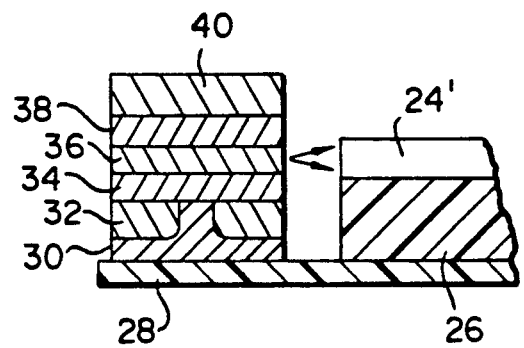

FIGS. 3a and 3b illustrate another embodiment wherein the waveguides 24' are fabricated on an oxidized silicon, SiO$_2$, substrate 26 and the diode lasers 22' are mounted on a silicon substrate 28. The laser diodes 22' are mounted on the silicon substrate 28 without a heat sink because the silicon substrate 28 provides a sufficient heat sink. Each laser diode 22' has a metal contact 30 mounted on the substrate 28. The metal contact 30 protrudes through a layer of silicon nitrite, SiN$_4$, and extends to contact a layer of gallium aluminum arsenide, GaAlAs, 34. The top layer 34 is a layer of gallium arsenide, GaAs, 36 beneath a layer of gallium aluminum arsenide, GaAlAs, 38 which lies below a top layer of gallium arsenide 40. Again, coupling efficiencies of greater than 50 percent can be achieved by a proper matching of numerical aperture of the waveguide and a precise alignment of the laser diode 22' to the waveguide 24'. Vertical alignment is made easier because the laser diode 22 is mounted on the same substrate 28 as the waveguide 24'.

Figure 4:
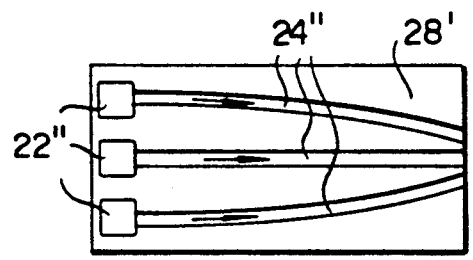
FIG. 4 is a diagrammatic view similar to FIGS. 3a and 3b, but illustrating the laser diodes and waveguides on a gallium arsenide substrate.

FIG. 4 illustrates another embodiment very similar to FIG. 3 but using a gallium arsenide, GaAs, substrate 28' on which the various layers are grown for fabrication of the laser diode 22''. A diode facet is etched, preferably using a chemical ion beam assisted technique. Using a mask, channel waveguide 24'' can be formed in alignment with the laser diode 22'' to couple light from the laser diode 22'' to the channel waveguide 24''. The channel waveguide material may need to be modified slightly, by disordering, for example, to decrease the waveguide loss. The embodiment of FIG. 4 does not require any precise alignment of the laser diodes 22'', and good coupling efficiency, greater than about 60-70 percent, is possible. If the waveguide loss is higher than about 1 decibel per centimeter or otherwise higher than desirable, then during the etching of the laser facets, channels can be etched and dielectric material, such as glass waveguide material, for example, can be used in the channels.

Figure 5A:
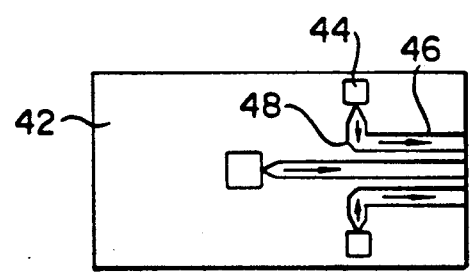
FIGS. 5a and 5b illustrate another embodiment of the laser diodes and waveguides on a gallium arsenide substrate similar to FIG. 3, but illustrating a different arrangement of the lasers and waveguides.
Figure 5B:
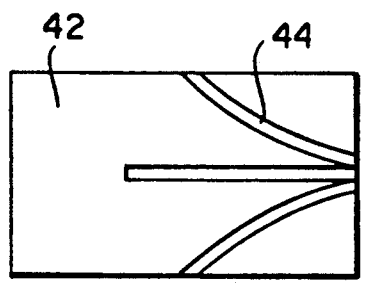

FIGS. 5a and 5b illustrate another embodiment wherein structures are grown on a gallium arsenide, GaAs, substrate 42 for multichannel recording. A laser 44 is grown and a facet is etched thereon, then a channel waveguide 46 is formed with a 90° bend. At the bend there is a mirror 48 that reflects light over 90° due to total internal reflection. Several channels can be made this way. The channel lengths are preferably short on the order of a few hundred microns so that optical loss is small. An alternative is not to etch a facet on the laser 44 thereby letting the 90° bent channel act as a laser cavity. Doing this provides minimum alignments and is easier to fabricate.

The above discussion with reference to FIGS. 2-5 has been primarily concerned with the recording channel only. The mechanism for multichannel recording operation includes the plurality of laser diodes wherein each diode is spaced a preselected distance from adjacent diodes and the plurality of channel waveguides that are coupled to the plurality of laser diodes with each channel waveguide then associated with a respective laser diode so that light emitted by the plurality of laser diodes is channeled for convergence at a point outside the waveguides. The preselected spacing of the laser beams 12 is less than about 50 $\mu$m which was heretofore unachievable, and, is preferably about 10 $\mu$m. The light emitted by the laser diodes is channeled to the collector lens by the channel waveguides. The channel waveguides define pathways that may vary in length and some of the waveguides may define straight paths and some may define arcuate paths so that the light emitted by the laser diodes converges at some point after exiting the channels. Preferably, the point of convergence is reached by the light beams prior to reaching the collector lens.

The above discussion has been concerned with the recording channel only. This could be useful in high speed writer applications such as a CD high speed writer. For the read channel, the reflected light coming back from the disk surface must be tapped.

Figure 6:
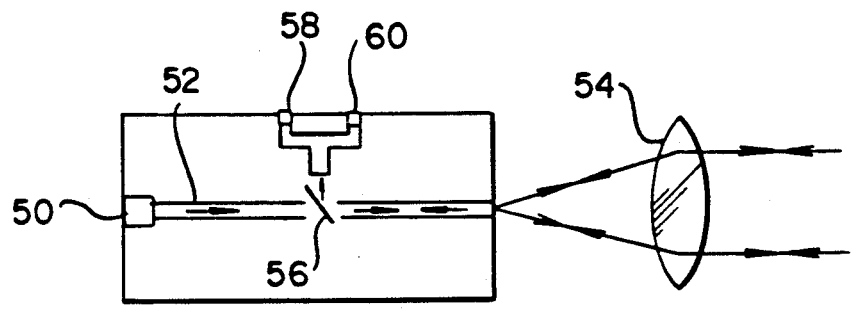
FIG. 6 illustrates a single laser diode of the laser diode array of FIG. 1 and the associated waveguide to illustrate the signal obtained by a beam splitter.
Figure 7:
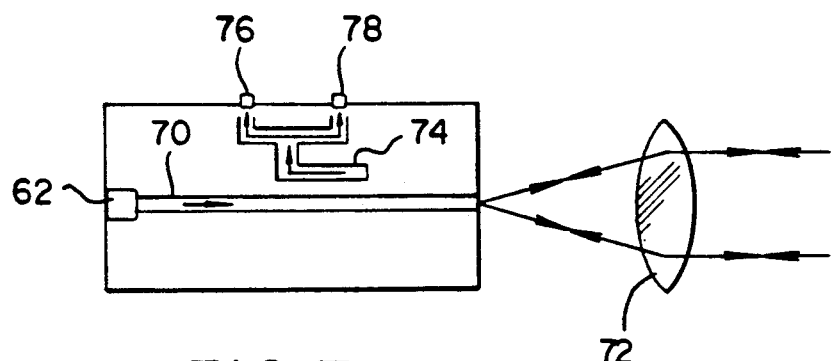
FIG. 7 illustrates a single laser diode as does FIG. 6, but illustrating obtaining a signal by coupling from one channel to another using polarization instead of the beam splitter of FIG. 6.
Figure 8:
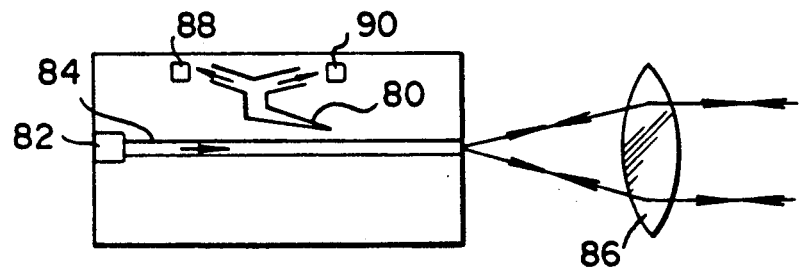
FIG. 8 is similar to FIGS. 6 and 7, but illustrates a signal obtained by coupling from one channel to another by a tapered edged channel.

FIGS. 6-8 illustrate apparatus for detecting the light reflected from the disk surface. FIG. 6 illustrates a laser diode 50 and waveguide 52 for emitting and channeling light to the lens 54. A beam splitter 56 directs the reflected beam onto detectors 58 and 60. One of the drawbacks to the use of the beam splitter 56 is that there is a loss of light and light gets fed to the diode laser 50 also. FIG. 6 thus illustrates a means for a multichannel reader wherein a beam splitter 56 is positioned in one of the channel waveguides which channel receives reflected light and detector means 58, 60 for detecting light and reflected light by way of the beam splitter 56.

FIG. 7 illustrates reading apparatus similar to FIG. 6 but using different elements. Light from a laser diode 62 travels through channel waveguide 70 to the collector lens 72 and reflected back to the channel waveguide 70. Light is tapped from the channel 70 by another channel 74 where the light is detected by detectors 76 and 78. If the incident beam is of one polarization and the reflected beam of another polarization, then the reflected beam can be coupled into the second channel 74 for detection purposes. This method requires a quarter-wave plate in the optical system and is not suitable for M-0 media detection.

In FIG. 8 a tapered channel 80 is used for detection of reflected light. Light emanating from laser diode 82 is channeled through channel waveguide 84 to the lens 86 where reflected light from the lens 86 is reflected back to the channel 82. The tapered channel 80 directs light to detectors 88 and 90. The tapered coupler insures that reflected light traveling in the channel waveguide 84 is channeled to the detectors 88, 90. The tapered waveguide approach does not require any polarization change. This should prove to be a good solution for readout signal detection.

FIGS. 6-8 illustrate means for multichannel reading which includes a plurality of detectors that detect reflected light and a plurality of detector waveguides. Each detector waveguide is associated with a selected one of the detectors and is coupled to a selected one of the channel waveguides so that reflected light travelling in the selected channel waveguide is channeled to the selected detector. The means for multichannel reading may include taper coupling and may also include a beam splitter that is positioned in one of the channel waveguides. Detector means are provided for detecting light and reflected light by means of the beam splitter.

Figure 9:
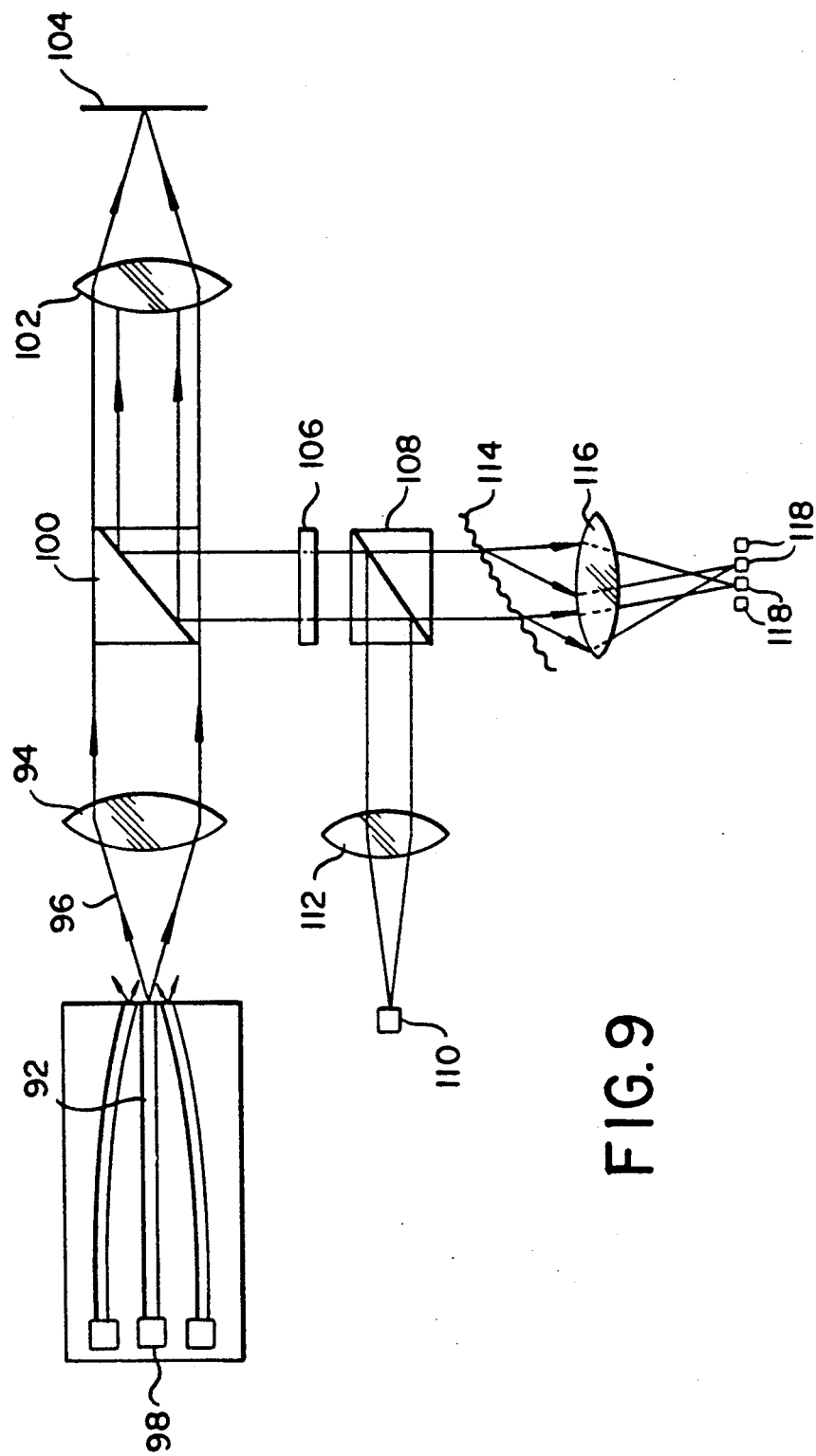
FIG. 9 illustrates an optical system with bulk optics to develop the focus and tracking signals.
Figure 10:
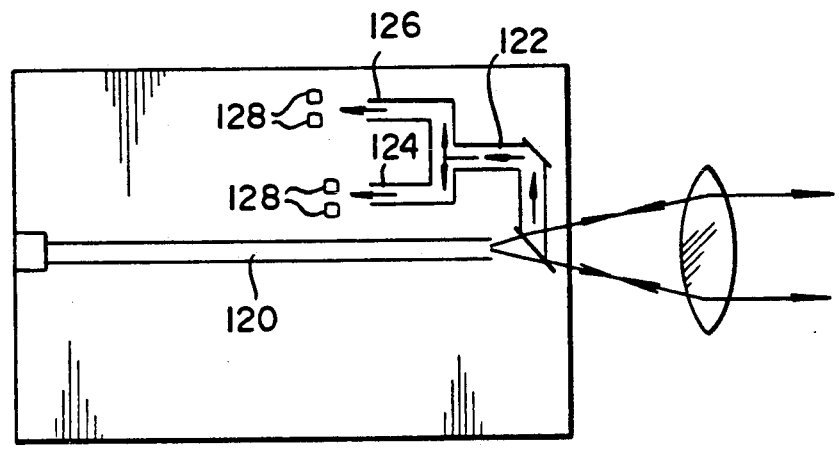
FIG. 10 illustrates another method of obtaining signals wherein reflected light from one channel is reflected into a multimode channel to develop the focus and tracking signals.
Figure 11:
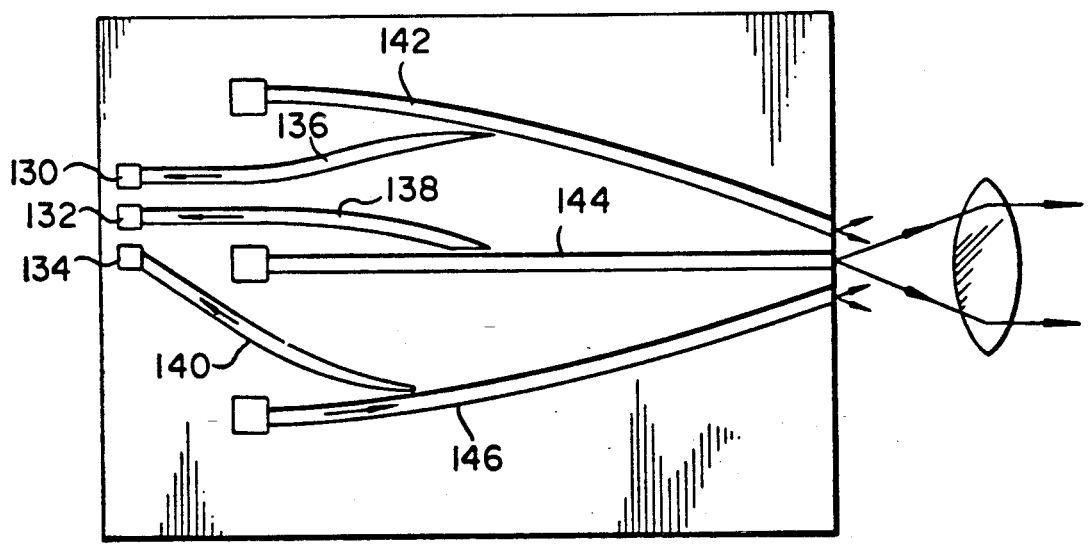
FIG. 11 is similar to FIGS. 9 and 10, but illustrates the use of tapered waveguides for developing signals.

FIGS. 9-11 illustrate apparatus for the detection of tracking and focus signals. FIG. 9 illustrates a bulk optics approach wherein there is one channel 92 with bulk optics which will do the focus and tracking signal as illustrated. The bulk optics includes a collector lens 94 which receives a light beam 96 from the channel 92 emitted by the channel diode 98. The beam 96 passes through a beam splitter 100 and a portion of the light travels to the collector lens 102 where it is directed to the surface of the disk 104. A portion of the light from the beam splitter 100 passes through quarterwave plate 106 and to beam splitter 108 where light from a second diode 110 is directed through a lens 112 to the second beam splitter 108. The output of the beam splitter 108 is directed to a grating surface 114 and a light therefrom is focused through lens 116 to detectors 118 for focus and tracking.

Referring now to FIG. 10, another embodiment is illustrated. In this embodiment light reflected from one channel 120 is reflected into a multimode channel 122 to keep the focus and tracking signal information. The multimode channel 122 is divided into two channels 124 and 126 to separate the beam for focus error detection and tracking error detection. A tracking error signal can be detected by using a split detector and the difference in the signal output of the two detectors gives the tracking error signal. The focus error signal can be detected by the total internal reflection method or by a beam size detection method. FIG. 10 thus illustrates a means for detecting errors which include a multimode waveguide channel 122 for receiving reflected light and a plurality of detectors 128 coupled to the mode to mode waveguide channel 122 sufficiently to detect focus and tracking errors.

FIG. 11 also illustrates apparatus for multichannel reading that includes detectors 130, 132, 134 for detecting reflected light and a plurality of detector waveguides 136, 138 140. Each of the detector waveguides 136, 138, 140 is associated with a respective detector 130, 132, 134 and is taper coupled to its associated channel waveguide 142, 144, 146 so that reflected light traveling in a selected channel waveguide is channeled to a selected detector. For example, reflected light traveling in channel waveguide 142 is taper coupled to detector waveguide 136, which channels light to detector 130.

It can now be appreciated that there has been presented an apparatus for multichannel recording, multichannel recording and reading, and multichannel recording with focus error and tracking error detection schemes. It can also be appreciated that there has been presented an apparatus for recording onto and reading from an optical disk. The apparatus includes a multisource array that has a plurality of laser diodes which each diode spaced a distance more than about 50 to 100 $\mu$m from adjacent diodes. But, the beams emanating from the waveguides are closely spaced less than about 50 $\mu$m from one another. This closer spacing is achieved without crosstalk or electro interferences because of a plurality of channel waveguides that are coupled to the laser diodes. Each channel waveguide is associated with a respective laser for directing the light emitted by the diode toward the optical disk for optical recording and it also receives reflected light from the optical disk for reading the optical disk. The arcuate configuration of the waveguides allows beams to be spaced as close as about 10 $\mu$m.

While the invention has been described with particular reference to the preferred embodiments, it will be understood by those skilled in the art that various changes may be made and equivalents may be substituted for elements of the preferred embodiment without departing from invention. In addition, many modifications may be made to adapt a particular situation and material to a teaching of the invention without departing from the essential teachings of the present invention.

As is evident from the foregoing description, certain aspects of the invention are not limited to the particular details of the examples illustrated, and it is therefore contemplated that other modifications and applications will occur to those skilled in the art. It is accordingly intended that the claims shall cover all such modifications and applications as do not depart from the true spirit and scope of the invention.

What is claimed is:

1. A multisource array for directing light to an optical disk for optical recording and receiving reflected light from said optical disk for reading said optical disk, comprising:

means for multichannel recording, including:

a plurality of laser diodes with each diode spaced a preselected distance from adjacent diodes; and a plurality of channel waveguides coupled to said plurality of laser diodes with each channel waveguide being associated with a respective laser diode so that light emitted by said plurality of laser diodes is channeled for convergence at a point outside of said waveguides.

2. A multisource array, as set forth in claim 1, comprising:

means for multichannel reading, including:

a beam splitter positioned in one of said channel waveguides which channel receives reflected light; and detector means for detecting light and reflected light via said beam splitter.

3. A multisource array, as set forth in claim 1, wherein light emanating from a first channel of said plurality of channel waveguides has a first polarization, and wherein a portion of said light is reflected back to a second channel of said plurality of channel waveguides and has a second polarization so that said second channel taps light from said first channel.

4. A multisource array, as set forth in claim 1, comprising:

means for multichannel reading, including:

a plurality of detectors for detecting reflected light;

a plurality of detector waveguides, each detector waveguide being associated with a selected one of said plurality of detectors and being taper coupled to a selected one of said plurality of channel waveguides so that reflected light travelling in said selected channel waveguide is channeled to said selected detector.

5. A multisource array, as set forth in claim 1, comprising:

means for detecting errors, including:

a multimode waveguide channel for receiving reflected light; and a plurality of detectors coupled to said multimode waveguide channel sufficient for detecting focus and tracking errors.

6. An apparatus for recording onto and reading from an optical disk, comprising:

a laser diode array having a plurality of laser diodes with each diode spaced a preselected distance greater than about 50 $\mu$m from adjacent diodes and having a plurality of channel waveguides coupled to said plurality of laser diodes, with each channel waveguide being associated with a respective laser, for directing light emitted by said plurality of laser diodes toward said optical disk for optical recording and for receiving reflected light from said optical disk for reading said optical disk, each of said channel waveguides spaced a preselected distance less than about 50 $\mu$m from adjacent waveguides.

7. An apparatus for recording onto and reading from an optical disk, comprising:

a plurality of laser diodes with each diode spaced a preselected distance from adjacent diodes; and a plurality of channel waveguides coupled to said plurality of laser diodes with each channel waveguide being associated with a respective laser diode so that light emitted by said plurality of laser diodes is channeled for convergence at a point outside of said waveguides.

8. An apparatus, as set forth in claim 7, wherein said preselected distance is greater than about 50 $\mu$m.

9. An apparatus, as set forth in claim 7, wherein each of channel waveguides is spaced from adjacent waveguides a preselected distance is less than about 50 $\mu$m.

10. An apparatus, as set forth in claim 7, wherein said apparatus has a collector lens and wherein light emitted by said plurality of laser diodes is channeled to said collector lens.

11. An apparatus, as set forth in claim 10, wherein said light emitted by said plurality of laser diodes converges prior to reaching said collector lens.

12. An apparatus, as set forth in claim 7, wherein at least one of said channel waveguides defines an arcuate pathway for light travelling from one of said laser diodes to said point of convergence.

13. An apparatus, as set forth in claim 7, wherein said channel waveguides define pathways of various lengths.

14. An apparatus, as set forth in claim 7, wherein at least one of said channel waveguides defines an angled pathway for light travelling from one of said laser diodes and contains a mirror at the angle to reflect light to said point of convergence.

15. An apparatus, as set forth in claim 14, wherein said laser diode has an etched facet.

16. An apparatus, as set forth in claim 14, wherein said angled channel acts as a laser cavity.

17. An apparatus, as set forth in claim 14, wherein said angled channel is spaced a preselected distance from said laser diode.

18. An apparatus, as set forth in claim 7, including a substrate, said waveguides being formed on said substrate and said diodes being mounted on said substrate.

19. An apparatus, as set forth in claim 18, wherein said substrate is an oxidized silicon wafer.

20. An apparatus, as set forth in claim 7, including a substrate, said waveguides being formed on said substrate and said diodes being formed on said substrate.

21. An apparatus, as set forth in claim 20, wherein said substrate is a GaAs substrate.

22. An apparatus, as set forth in claim 7, wherein a portion of said light is reflected back to said plurality of channel waveguides and including:

a detector for detecting reflected light;

a detector waveguide taper coupled to a selected one of said plurality of channel waveguides so that reflected light travelling in said channel waveguide is channeled to said detector.

23. An apparatus, as set forth in claim 22, wherein there are a plurality of detectors sufficient for developing error signals.

24. An apparatus, as set forth in claim 7, wherein a portion of said light is reflected back to one channel of said plurality of channel waveguides and including:

a beam splitter in said channel waveguide; and detector means for detecting light and reflected light via said beam splitter.

25. An apparatus, as set forth in claim 7, wherein light emanating from a first channel of said plurality of channel waveguides has a first polarization, and wherein a portion of said light is reflected back to a second channel of said plurality of channel waveguides and has a second polarization so that said second channel taps light from said first channel.

26. An apparatus, as set forth in claim 7, wherein a portion of said light is reflected back to said plurality of channel waveguides and including:
a multimode waveguide channel; and
a plurality of detectors coupled to said multimode waveguide channel sufficient for developing error signals.

* * * * *